(12) United States Patent
Dischler

(10) Patent No.: US 6,330,540 B1
(45) Date of Patent: Dec. 11, 2001

(54) HAND-HELD COMPUTER DEVICE HAVING MIRROR WITH NEGATIVE CURVATURE AND VOICE RECOGNITION

(76) Inventor: Louis Dischler, 252 W. Park Dr. Duncan Park, Spartanburg, SC (US) 29306-5013

( * ) Notice: Subject to any disclaimer, the term of this patent is extended or adjusted under 35 U.S.C. 154(b) by 0 days.

(21) Appl. No.: 09/321,293

(22) Filed: May 27, 1999

(51) Int. Cl.[7] .................................................. G10L 15/22
(52) U.S. Cl. .......................................... 704/275; 704/277
(58) Field of Search .................................. 704/275, 277, 704/270, 276, 200, 201, 270.1, 272, 235, 278, 231

(56) References Cited

U.S. PATENT DOCUMENTS

| | | |
|---|---|---|
| 4,949,382 | 8/1990 | Griggs . |
| 5,157,503 | 10/1992 | Dugdale . |
| 5,377,303 | 12/1994 | Firman . |
| 5,519,569 | 5/1996 | Sellers . |
| 5,648,789 * | 7/1997 | Beadles et al. .......................... 345/8 |
| 5,737,183 | 4/1998 | Kobayashi . |
| 5,878,395 * | 3/1999 | Bennett ................................ 704/275 |
| 5,991,085 * | 11/1999 | Rallison et al. ..................... 359/630 |
| 6,005,536 * | 12/1999 | Beadles et al. .......................... 345/7 |
| 6,057,966 * | 5/2000 | Carroll et al. ....................... 359/630 |
| 6,137,675 * | 10/2000 | Perkins . |
| 6,208,468 * | 3/2001 | Togino et al. ....................... 359/637 |

* cited by examiner

*Primary Examiner*—Richemond Dorvil

(57) ABSTRACT

A voice controlled compact computer device (10) is provided in which speech is substituted for keyboard entry of text and for control signals otherwise input by keyboard or pointing device. Spoken words and commands are recognized by an interpreter and displayed in real time to only one eye, using a compact folded display having at least one mirror with negative curvature (16). In another embodiment, a second mirrored display (38) is used to project an independent image to the other eye.

19 Claims, 6 Drawing Sheets

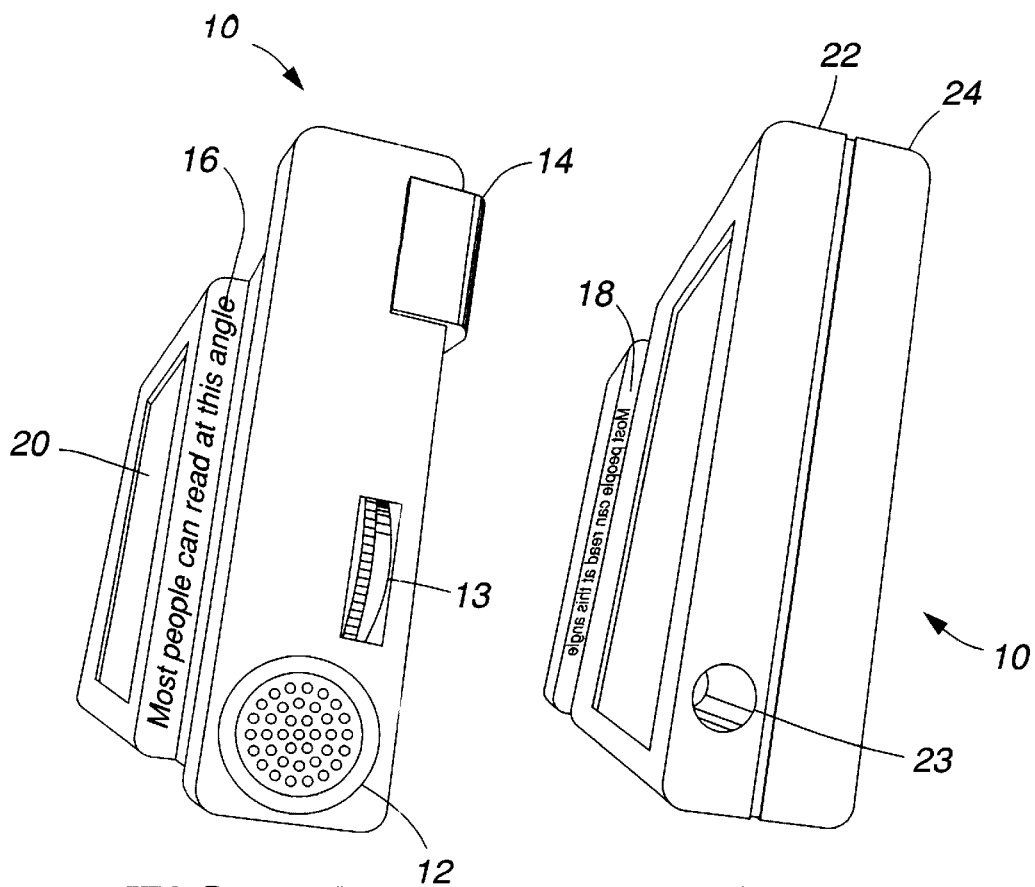
FIG. 1A  FIG. 1B
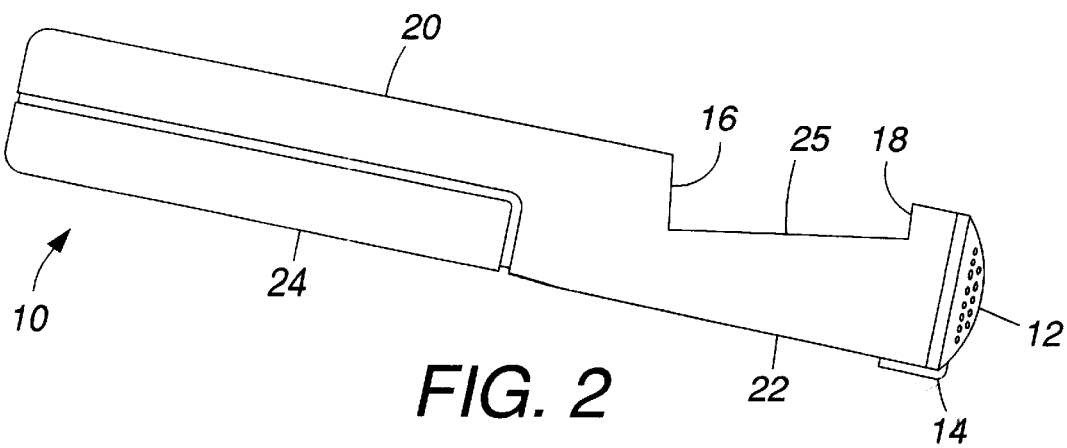
FIG. 2

FIG. 3
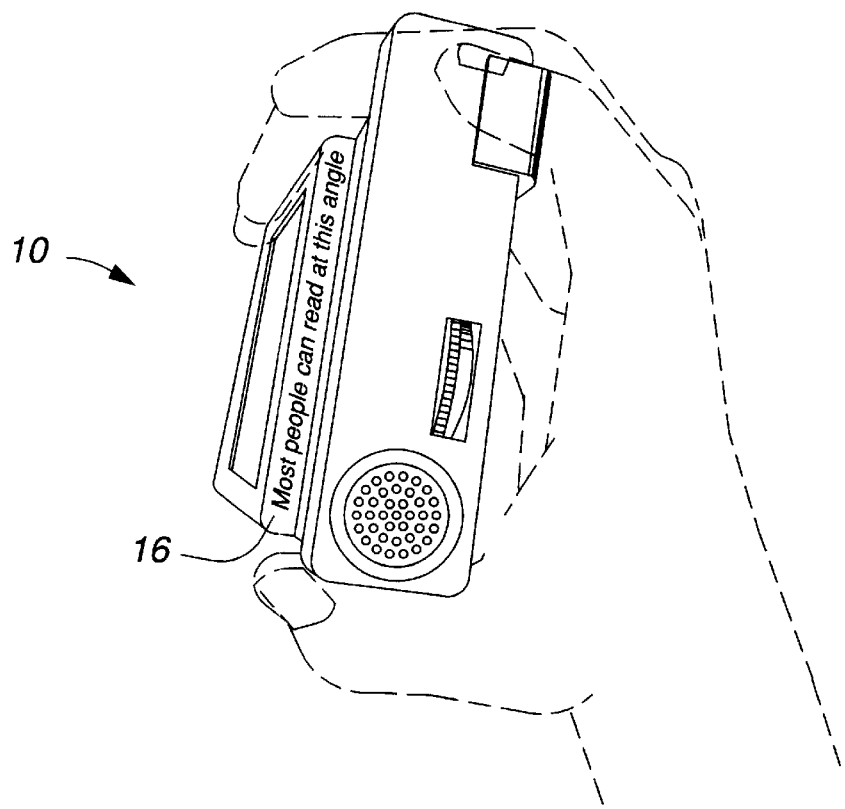
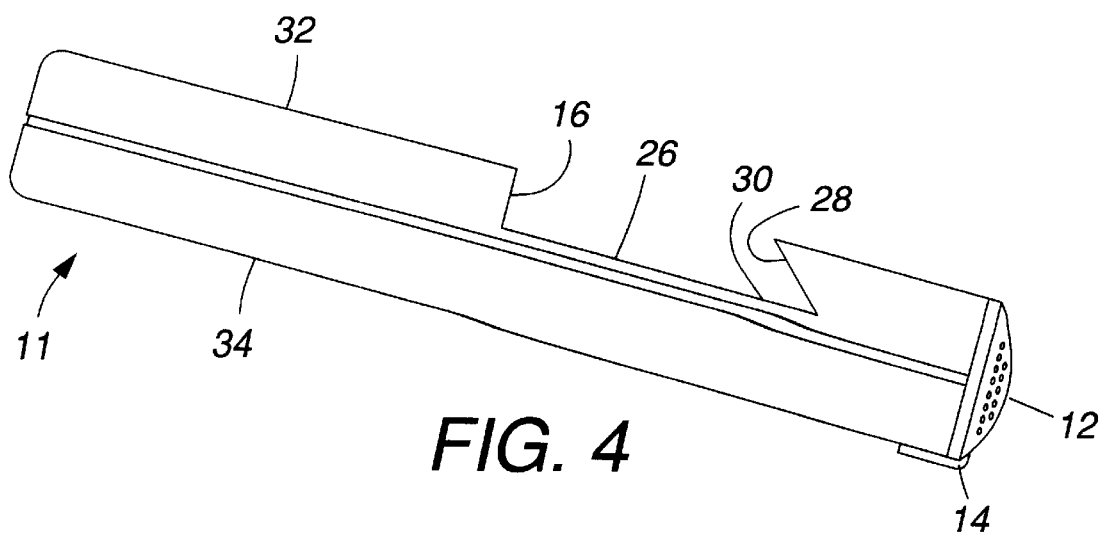
FIG. 4

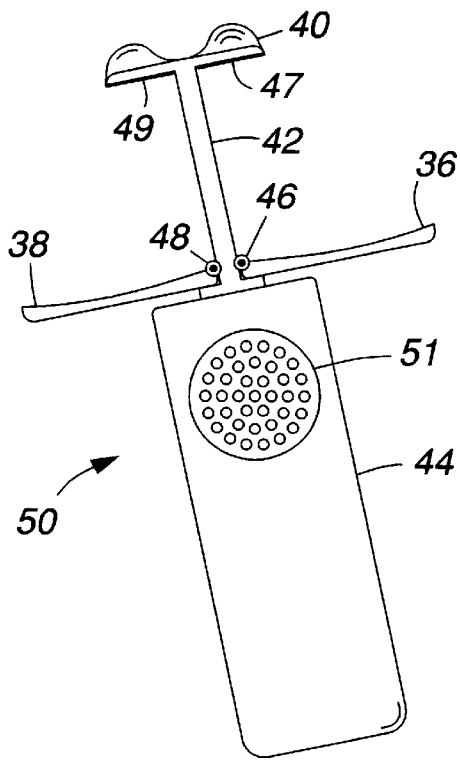
FIG. 5A
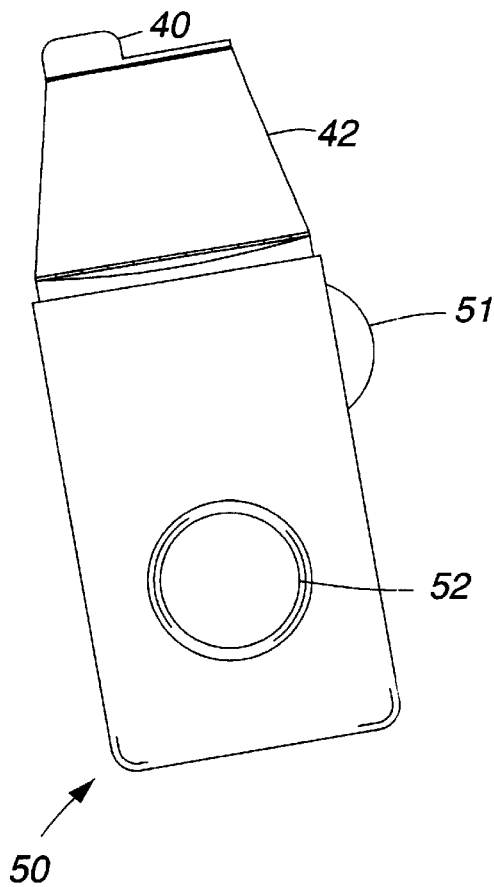
FIG. 6
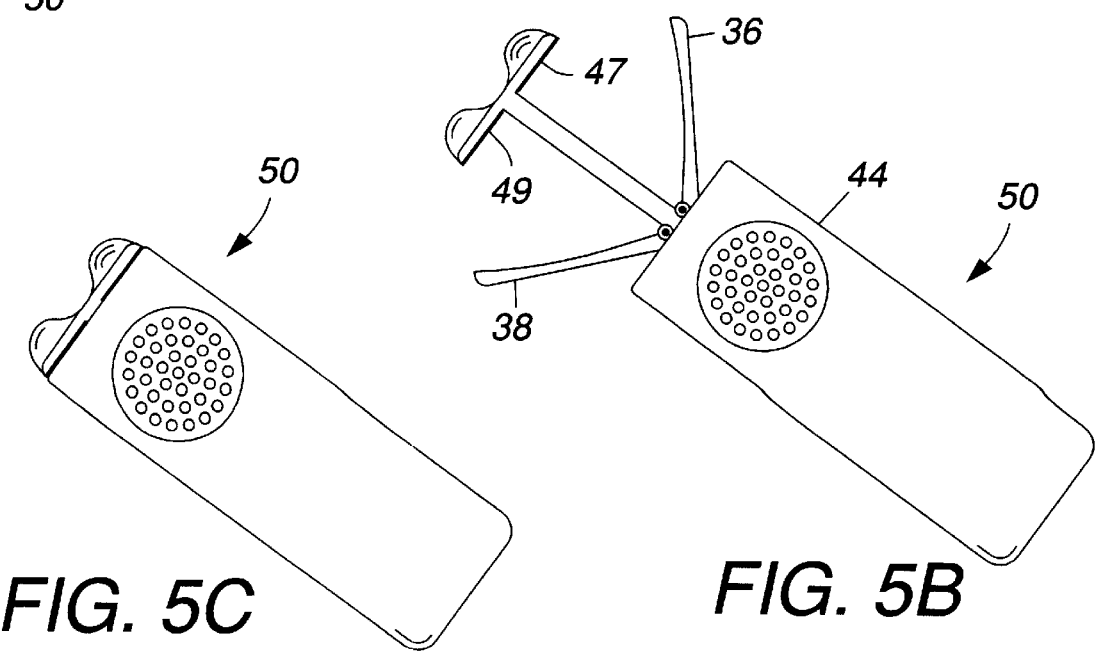
FIG. 5C
FIG. 5B

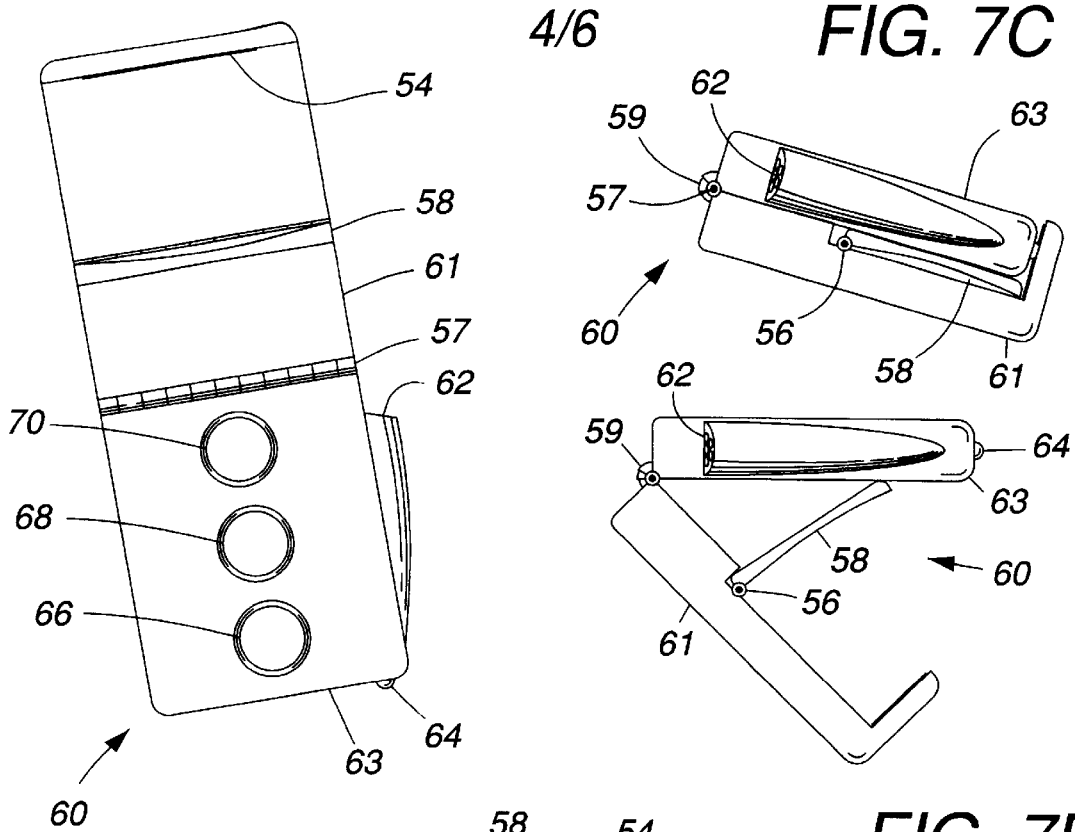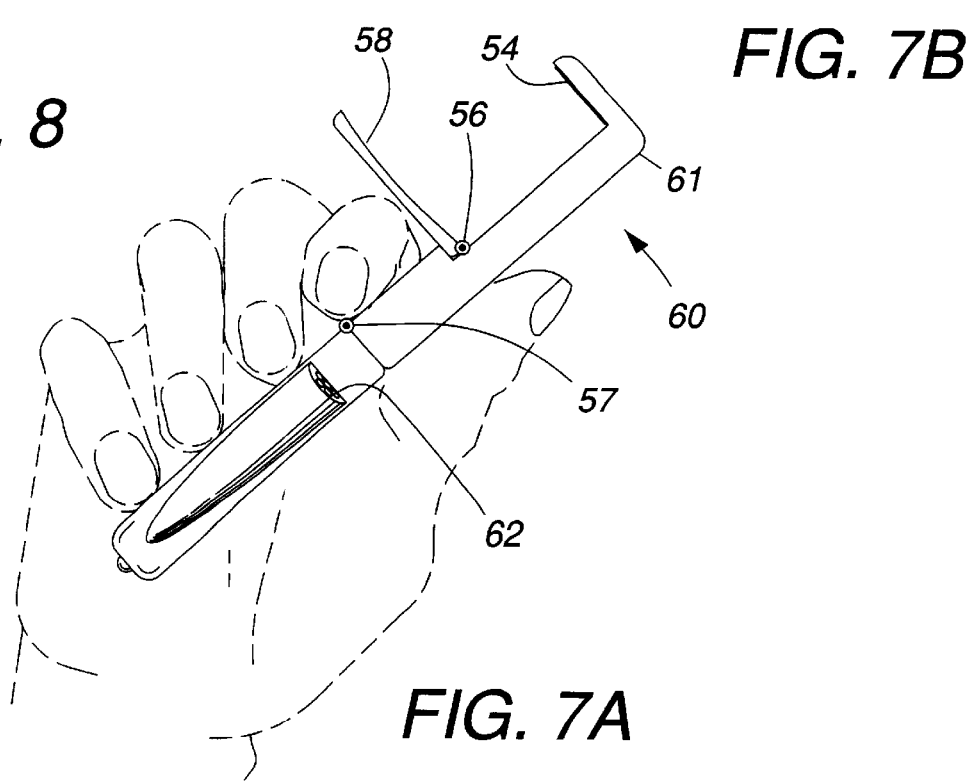

HAND-HELD COMPUTER DEVICE HAVING MIRROR WITH NEGATIVE CURVATURE AND VOICE RECOGNITION

FIELD OF THE INVENTION

This invention relates to voice controlled compact computer devices. A hand-held computer device is provided in which speech is substituted for keyboard entry of text and for control signals otherwise input by keyboard or pointing device. Spoken words and commands are recognized by an interpreter and displayed in real time to only one eye, using a compact folded display having at least one mirror with negative curvature. In another embodiment, a second mirrored display is used to project an independent image to the other eye.

BACKGROUND OF THE INVENTION

Voice recognition systems, which can convert human speech into computer information, are known to those versed in the art. U.S. Pat. No. 5,377,303 to Firman, teaches such a voice recognition system and is incorporated herein in its entirety by reference. Such systems may be insensitive to the speed of the spoken input and may operate fast enough to visually display the interpreted speech real time. Such a system is described by U.S. Pat. No. 4,949,382 to Griggs, herein entirely incorporated by reference.

The use of mirrors with negative curvature for magnification is well known; spherical and parabolic mirrors have been used in reflecting telescopes for centuries. The use of such a mirror to reflect the display of a CRT is described in U.S. Pat. No. 5,157,503 to Dugdale, the teachings therein incorporated in their entirety herein by reference. The mirrored display, as taught by Dugdale, is necessarily bulky, because of the use of a CRT, and the use of one mirror to display to both eyes necessarily requires a large mirror.

Hand-held computers such as notebook and palm computer have been commercially available for a number of years. Such computers are described in U.S. Pat. No. 5,737,183 to Kobayashi, and in U.S. Pat. No. 5,519,569 to Sellers. The degree that the size of such a computer may be reduced is primarily limited to the presence of a keyboard or other data entry means, as well as the relatively large display screen required for viewing at a normal reading distance.

OBJECT OF THE INVENTION

The primary object of this invention is therefore to provide a hand-held compact computer of minimal size, wherein data entry is primarily by means of voice, and whereby real time visual feedback of the interpreted speech is displayed to one eye by a mirror with negative curvature.

Another object of this invention is to provide a computerized telephone whereby dialing may be achieved by voice entry alone, and where a mirror with negative curvature allows one eye to view the number or the name of the person being called, without having to remove the telephone from its normal speaking and listening position.

Another object of this invention is to provide an inexpensive and lightweight display for a compact hand-held computer, while allowing the user to simultaneously observe the environment.

Another object of this invention is to provide a display for a hand-held computer whereby one eye may easily observe the display.

Another object of this invention is to provide a binocular display for a hand-held computer whereby a display is presented to each eye by separate mirrors, and where each eye may only view one display.

DESCRIPTION OF THE INVENTION

In general, in one aspect, the instant invention allows voiced utterances to be substituted for keyboard entry of text, with a real time display of the interpreted utterances reflected and magnified by a mirror having negative curvature. The elimination of the need for a keyboard or pointing device allows for the device to be sufficiently compact to comfortably fit into a shirt pocket, while the display allows for comfortable reading and editing of the interpreted utterances.

In another aspect of the instant invention, when used as a Dictaphone, the real time display allows the accuracy of the interpreting to monitored and for immediate editorial corrections to be made without having to move the device from a dictation mode to a more distant reading mode.

In another aspect of the instant invention, when used as a telephone, the user may simply speak the name of the person to be called, rather than using a keyboard entry. If the name has been earlier entered with an associated phone number, the name and phone number are displayed by means of a mirror with negative curvature, allowing the user to validate whether the number the telephone is about to dial is the correct number. If the telephone has access to a data bank, such as might be accessed using an Internet connection, then the telephone could also seek to match a number to the spoken name, if no match was otherwise known. Alternatively, the telephone number may be directly verbally entered. Obviously, all of the speech of the user may be interpreted, and such a telephone may be used to transmit only the interpreted speech, at a considerable reduction in the amount of transmitted information required.

It is an aspect of the instant invention that the display be reflected to the viewer by means of a mirror having negative curvature, so as to magnify the image and place it on more distant focal plane, where it may by more easily viewed. This allows the image to be viewed without eyestrain even with the mirror very close to the eye. Typically the mirror would be placed between 10 and 300 mm from the eye, and more preferably 20 to 200 mm from the eye. The display reflected by the mirror is located between the eye and the mirror. The display is also preferably placed to one side or below the level of the eye, allowing the most comfortable and natural viewing, and generally allowing maximal ambient lighting of the display, as it is undesirable to expend limited battery resources for auxiliary lighting. Mirrors with negative curvature that may be employed in this invention include spherical, parabolic, hyperbolic and toroidal types. Spherical mirrors are preferred as being of lowest cost.

The reflected image is preferably directed to one eye, herein referred to as the active eye, while no part of the image is easily visible to the other eye, herein referred to as the passive eye. Allowing part of the display to be visible to the passive eye degrades the readability of the display, causing fatigue. If the mirror were large enough for the display to be fully visible to both eyes, in could not be contained within the constraints of a hand-held device.

The reflected image of the display may be made visible to only one eye by placing the display on a generally vertical alignment, and restricting the number of lines displayed so that none can be read by the passive eye. This allows sentences of a number of words to be formed on a single line, which if presented horizontally at the same distance could be partially read by the passive eye, creating difficulty in reading. Most people are able to read sentences at orientations of up to about 90 degrees from the horizontal, and improve quickly with practice. A switch may be used to invert the text, so that the display may be easily read using the right or left hands. The inversion may also be accomplished automatically by means of an accelerometer or mercury switch located within the housing, or by a manual switch, but is preferably accomplished by means of a verbal command.

The reflected image of the display may be also be shielded from the passive eye by the housing of the instant invention, or by the nose of the user. Only sufficient shielding is necessary so that the passive eye cannot recognize what is sees, so as to prevent a dominance conflict between the eyes. The mirror should preferably be located at approximately 75 mm or closer to the active eye in order to effectively use the nose as a shield; however, it preferred to use the housing of the hand-held computer itself to block the view of the passive eye, as the size of the nose is unpredictable. The housing may also be used effectively to block the breath of the user, so as to prevent possible fogging of the mirror.

While a vertically oriented mirrored display, having dimensions relatively tall and narrow, may be built into the housing so that the geometrical aspect of the housing need not be changed for use, a larger and wider display may be employed if the mirror is capable of folding or sliding into the housing.

Two mirrored displays may be used, one for viewing with each eye, with the housing blocking cross viewing of the displays. In this way different displays may be advantageously presented to each eye. For example: binocular effects may be achieved; or a presentation of the interpreted vocalized input may be displayed in one mirror, and a translation of the interpreted input into a foreign language displayed in the other. A nose rest may be provided to stabilize the eye-to-display alignment.

In general, eliminating other than voice entry of data or commands minimizes the size of an embodiment of the instant invention. As the device is hand-held, and fingers are therefore always in contact with the housing while the device is actively used, keys may be placed on the housing, preferably where fingers would normally grip the housing, so that no movement of the fingers along the housing would be needed for actuation. One key may be conveniently dedicated to the command prompt function, that is, when depressed, the next input expected would be a command. Other keys could be dedicated to scrolling the display up or down; however, it is desirable that a keyboard not be placed on the housing.

The mirrored display is the primary feedback for the user, especially while actively entering verbal input. A second (non-mirrored) display may be placed on the housing for auxiliary reference or editing. It is preferred that the displays be relatively flat and lightweight. While a LED display may be used, a LCD display is most preferred as it requires less power for operation. The housing would typically also contain a computer, battery or solar power, and means for downloading the interpreted voice data, which might comprise a removable disk or tape, or exterior port connection.

Other advantages and features will become apparent from the following description of the preferred embodiment and from the claims.

BRIEF DESCRIPTION OF THE DRAWINGS

FIG. 1A is a front perspective view of a narrow view recorder.

FIG. 1B is a rear perspective view of the narrow view recorder shown in FIG. 1A.

FIG. 2 is a left side view of the narrow view recorder shown in FIGS. 1A and 1B.

FIG. 3 is a front perspective view of a narrow view recorder shown in FIG. 1A, held in an operational position.

FIG. 4 is a left side view of an alternative mirror arrangement to that shown in FIG. 2

FIG. 5A is a bottom plan view of a double view recorder in a fully extended aspect.

FIG. 5B is a bottom plan view of the double view recorder shown in FIG. 5A in a partially extended aspect.

FIG. 5C is a bottom plan view of the double view recorder shown in FIG. 5A in a fully retracted aspect.

FIG. 6 is a left side view of the double view recorder shown in FIG. 5A.

FIG. 7A is a left side view of a folding recorder in a fully opened aspect, showing the normal position of a user's hand.

FIG. 7B is a left side view of the folding recorder of FIG. 7A in a partially folded aspect.

FIG. 7C is a left side view of the folding recorder of FIG. 7A in a fully folded aspect.

FIG. 8 is a top plan view of the opened recorder shown in FIG. 7A.

Figure 9A:
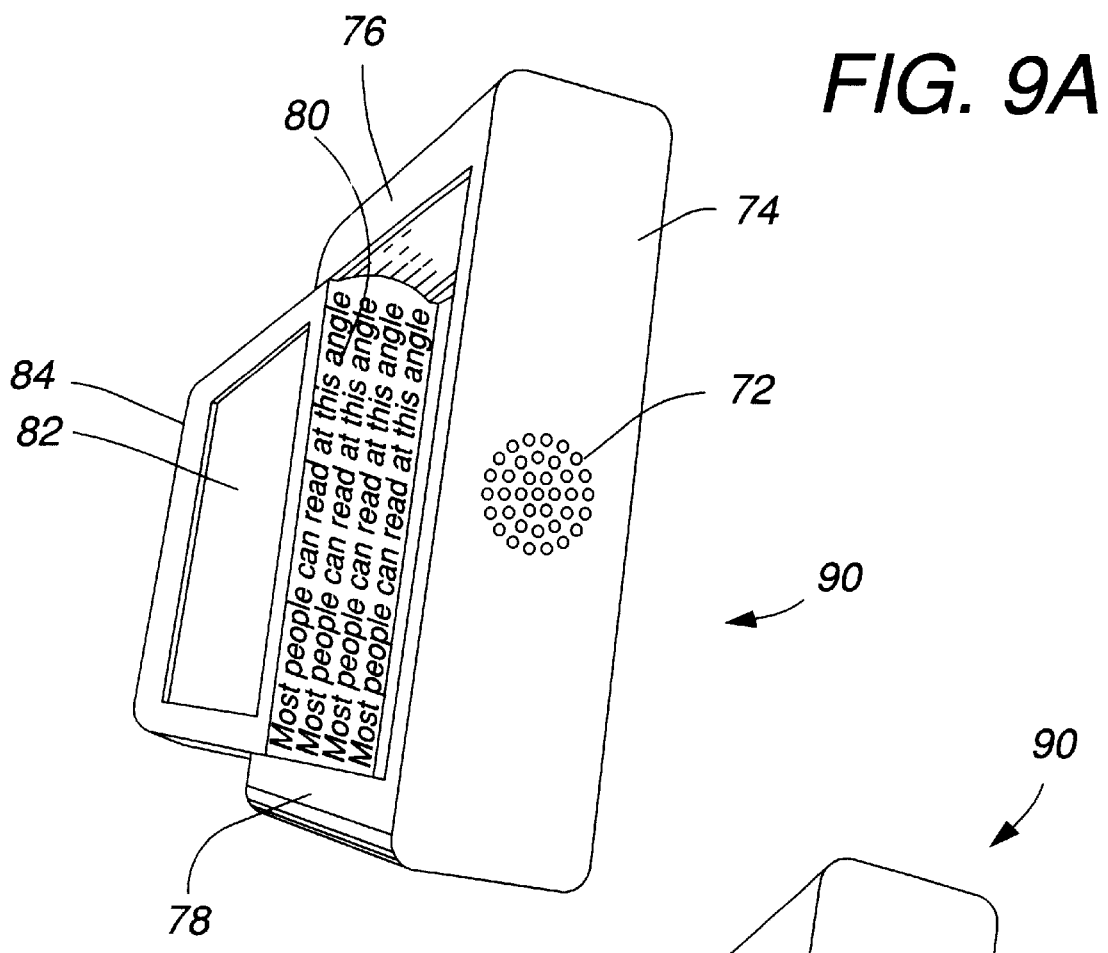
FIG. 9A is a front perspective view of a multi-line recorder in a fully opened aspect.

| | |
|---|---|
| 10 | narrow view recorder |
| 11 | narrow view recorder |
| 12 | microphone |
| 13 | volume control |
| 14 | function key |
| 16 | display mirror |
| 18 | primary display |
| 20 | auxiliary display |
| 22 | recorder housing |
| 23 | communication jack |
| 24 | access door |
| 25 | primary display land |
| 26 | primary display land |
| 28 | secondary mirror |
| 30 | primary display |
| 32 | top housing section |
| 34 | bottom housing section |
| 36 | right display mirror |
| 38 | left display mirror |
| 40 | bridge rest |
| 42 | beam |
| 44 | housing body |
| 46 | spring hinge |
| 47 | right display |
| 48 | spring hinge |
| 49 | left display |
| 50 | double view recorder |
| 51 | microphone |
| 52 | function key |
| 54 | display |
| 56 | spring hinge |
| 57 | spring hinge |
| 58 | mirror |
| 59 | telescoping conduit |
| 60 | folding recorder |

| | -continued |
|---|---|
| 61 | upper housing |
| 62 | microphone |
| 63 | lower housing |
| 64 | latch |
| 66 | function key |
| 68 | function key |
| 70 | function key |
| 72 | microphone |
| 74 | slide |
| 76 | slide column |
| 78 | slide column |
| 80 | display mirror |
| 82 | auxiliary display |
| 84 | base |
| 90 | multi-line recorder |
| 92 | antenna |
| 94 | speaker |
| 96 | function key |
| 98 | auxiliary display |
| 100 | telephone |
| 102 | microphone |
| 104 | display mirror |
| 106 | display |
| 108 | function key |
| 110 | function key |
| 112 | function key |
| 114 | housing |

DETAILED DESCRIPTION

Referring now to the drawings, in which like reference numerals designate identical or corresponding parts throughout the several views. FIGS. 1A, 1B and 2 are illustrations of a narrow view recorder, generally indicated by the numeral 10. A single line of reversed text in display 18 is reflected and magnified to one eye by negatively curved mirror 16. Function key 14 may be depressed to initiate recording. A rotary wheel serves as a volume control 13, to allow for variations in speaking and ambient noise conditions at microphone 12. An optional auxiliary display 20 is provided for multi-line viewing at a normal viewing distance. A communication jack 23 is supplied at the bottom of the unit for downloading stored data. The computational module and power supply (not shown), are enclosed within the recorder housing 22, and the access door 24.

FIG. 3 illustrates the normal position of use for viewing the recorder 10 with the right eye as the active eye. The viewing angle is too narrow to allow the passive eye to see text in the mirror 16.

FIG. 4 illustrates an alternative mirror arrangement to that of FIG. 2. One or more lines of normal (not mirror imaged) text is produced on the primary display 30, which lies at the font end of the primary display land 26. The text is reflected by the plane mirror 28, oriented at 45 degrees to the primary display 30, and reflects a mirrored image to the curved mirror 16, and thence to the active eye of the user. Mirror 28 and mirror 16 may both be attached to top housing section 32, in order to provide a fixed relationship. The top housing section 32 mates with bottom housing section 34 to complete the housing of the narrow view recorder 11.

FIGS. 5A, 5B, 5C, and FIG. 6 are illustrations of a double view recorder, generally indicated by the numeral 50. In FIG. 5A, the recorder 50 is shown in the extended use position. Right mirror 36, having a negative curvature, reflects and magnifies the image of right display 47. Similarly, left mirror 38 reflects and magnifies the image of left display 49. The displays 47, 49 are mounted at the distal end of beam 42. A curved bridge rest 40 allows the displays to be steadied and positioned at the bridge of the nose. The right mirror 36 is hinged by means of a spring hinge 46 to the base of the beam 42, and the left mirror 38 is similarly hinged at spring hinge 48. The base of the beam 42 telescopes into housing body 44. In use, microphone 51 is located along the bottom surface of the recorder 50.

FIG. 5B illustrates the partial closure of the recorder 50. The mirrors 36, 38 begin to fold inward towards beam 42 for storage as the beam 42 telescopes into the housing body 44. In FIG. 5C, the recorder 50 is entirely closed. In FIG. 6, a side view of the recorder 50, a function key 52 is used for indicating to the recorder that a subsequent vocalization is to be interpreted as a command.

FIGS. 7A, 7B, 7C, and FIG. 8 are illustrations of a folding recorder, generally indicated by the numeral 60. In FIG. 7A the recorder 60 is shown unfolded, and as it might be comfortably held in hand of a user. Display 54 is reflected and magnified by mirror 58 that is foldably attached to upper housing 61 by means of spring hinge 56. The combination of display 54 and mirror 58 allows several lines of text or graphics to be viewed. Microphone 62 is located along the side of lower housing 63, so that the breath is not directed towards the mirror 58. In FIG. 7B, the recorder 60 is shown in a semi-folded configuration. Upper housing 61 is foldably attached to lower housing 63 by means of spring hinge 57. Folding the housings 61, 63 together also forces mirror 58 to begin to rotate about hinge 56. Flexible power and communication lines between housings 61, 63 may be protectively encased in telescoping conduit 59. In FIG. 7C, the recorder 60 is shown in the fully folded configuration, with the mirror 58 nestled between housings 61, 63. Latch 64 provides a detent to keep the recorder 60 closed. FIG. 8 is a top plan view of the recorder 60, showing the elements that are hidden when the recorder 60 is folded as in FIG. 7C. Display 54, mirror 58, and control keys 66, 68, and 70 are all hidden and protected in the folded configuration. Keys 66, 68, 70 may control such functions as command prompt, scrolling of the display, and erasure of text. All such functions may also be entered verbally, but the keys provide a shortcut entry.

Figure 9B:
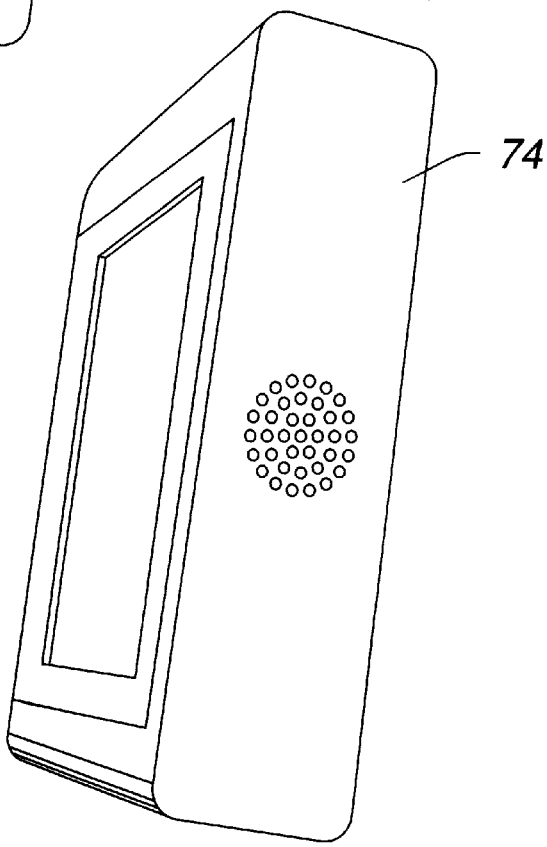
FIG. 9B is a front perspective view of the multi-line recorder of FIG. 9B in a fully closed aspect.

FIGS. 9A and 9B are perspective illustrations of a multi-line recorder generally indicated by the numeral 90. Mirror 80 reflects and magnifies a display (not shown), which lies underneath the top surface of slide 74, and opposite the mirror 80. Slide 74 is slideably connected to base 84 by way of slide columns 76, 78, which also serve to block the view of the passive eye. A microphone 72 is centrally located on the top surface of slide 74. Housing 84 contains an auxiliary display 82, and optional function keys (not shown). Pressing the tops surface of the slide 74 results in the compact configuration of the recorder 90 shown in FIG. 9B.

Figure 10A:
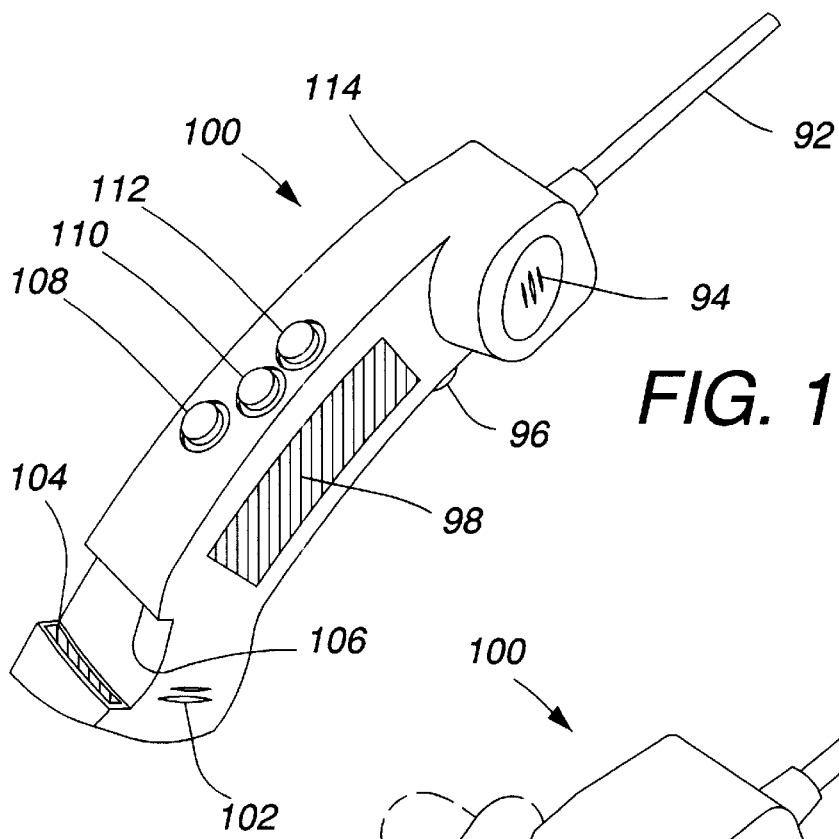
FIG. 10A is a perspective view of a telephone embodying the instant invention.
Figure 10B:
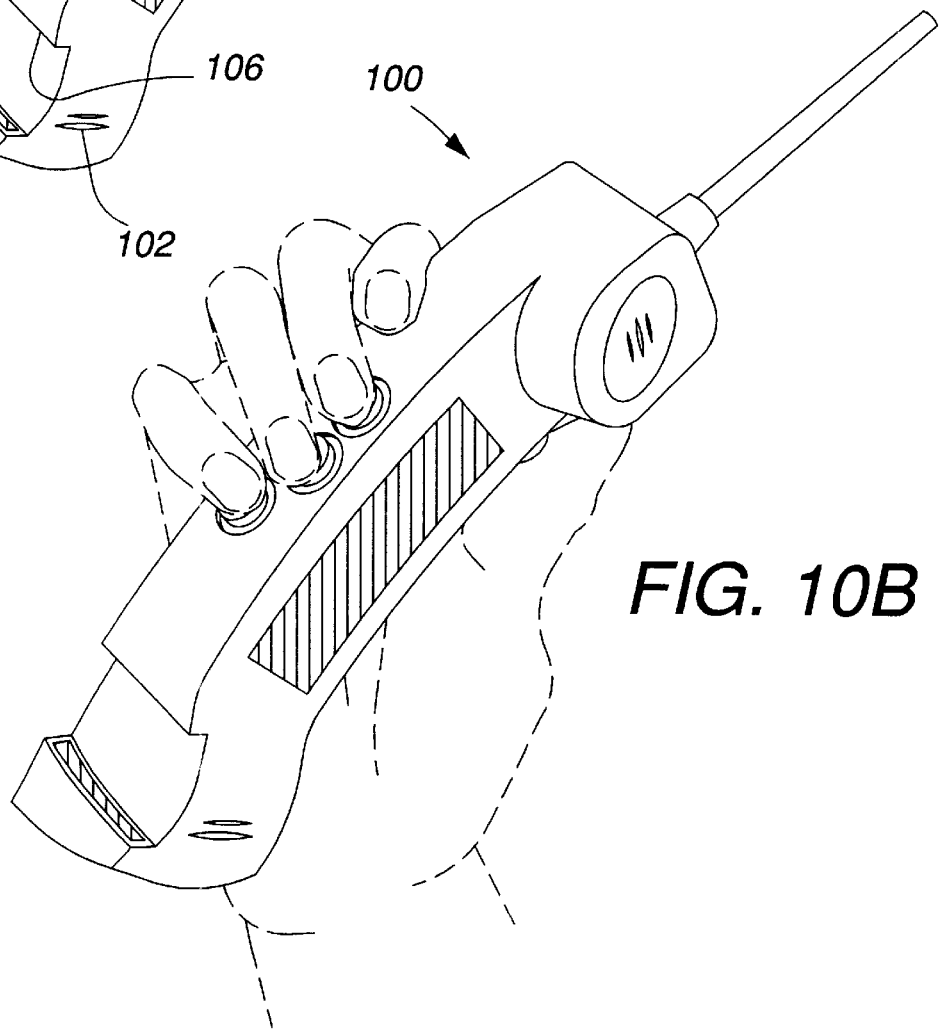
FIG. 10B is a perspective view of FIG. 10A, showing the normal position of a hand.

All of the embodiments illustrated in the previously discussed figures do not penetrate the plane of the face; that is, they do not comprise elements that extend along the side of the head. FIGS. 10A and 10B are perspective views of a telephone, generally indicated by the numeral 100, according to an embodiment the instant invention, which extends past the front plane of the face, so that a speaker 94 can be placed near an ear. In FIG. 10A, the telephone 100 is seen to comprise housing 114, to which is attached an antenna 92. Mirror 104 reflects and magnifies the image of display 106. Function keys 108, 110, 112 on the top surface of the housing 114 and key 96 on the rear surface of the housing serve such functions as redial, hold, command prompt, or disconnect. Such functional assignments are by means of example only, as has been intended throughout this discussion for the various embodiments. Auxiliary display 98 serves for reviewing telephone numbers and the like at a normal reading distance. FIG. 10B shows the telephone 100 as would it would be conveniently utilized.

It is not intended that the scope of the invention be limited to the specific embodiments described herein, rather, it is intended that the scope of the invention be defined by the appended claims and their equivalents.

I claim:

1. A compact hand-held computer device for viewing by a user with an active eye, comprising:

(a) a housing sized for hand-held use by the user;

(b) a microphone disposed on said housing;

(c) a computer disposed within said housing;

(d) a system for interpreting spoken words of a first language disposed within said housing;

(e) a primary display disposed on said housing;

(f) a mirror mounted on said housing, said mirror having negative curvature for reflecting and magnifying said primary display only to the active eye of the user while the computer device is hand-held during use; and (g) wherein said negative curvature is sufficient for viewing said primary display in said mirror by the active eye of the user when said mirror is placed at a distance from said active eye, wherein said distance lies in the range of 10 mm to 300 mm;

whereby the accuracy of the interpreting may be monitored, and editorial corrections may be made without having to move the device from a dictation mode to a more distant reading mode.

2. A compact hand-held computer device for viewing by a user with an active eye, as recited in claim 1, wherein said primary display is a LCD display.

3. A compact hand-held computer device for viewing by a user with an active eye, as recited in claim 1, wherein said primary display is a LED display.

4. A compact hand-held computer device for viewing by a user with an active eye, as recited in claim 1, wherein said mirror is selected from a group consisting of spherical, parabolic, hyperbolic, and toroidal mirrors.

5. A compact hand-held computer device for viewing by a user with an active eye, as recited in claim 1, further comprising translation means for translating said spoken works of said first language into words of a second language.

6. A compact hand-held computer device for viewing by a user with an active eye, as recited in claim 1, wherein said primary display is disposed between the active eye and said mirror, and positioned to the side of the mirror.

7. A compact hand-held computer device for viewing by a user with an active eye, as recited in claim 1, wherein said primary display is disposed between the active eye and the mirror, and positioned below the mirror.

8. A compact hand-held computer device for viewing by a user with an active eye, as recited in claim 1, wherein said primary display is capable of displaying at least one line of mirror image text.

9. A compact hand-held computer device for viewing by a user with an active eye, as recited in claim 1, further comprising an auxiliary display for use at a normal reading distance.

10. A compact hand-held computer device for viewing by a user with an active eye, as recited in claim 1, further comprising at least one function key.

11. A compact hand-held computer device for viewing by a user with an active eye, as recited in claim 1, further comprising a transfer mirror disposed between said mirror and said primary display, for transferring the image of said display to said mirror.

12. A compact hand-held computer device for viewing by a user with an active eye, as recited in claim 1, further comprising port means for downloading stored information to another device.

13. A compact hand-held computer device for viewing by a user with an active eye, as recited in claim 1, further comprising removable information storage means.

14. A compact hand-held computer device for viewing by a user with an active eye, as recited in claim 1, further comprising antenna means.

15. A compact hand-held computer device for viewing by a user with an active eye, as recited in claim 1, further comprising Internet access means whereby interpreted voice communication may be transmitted as text.

16. A compact hand-held computer device for viewing by a user with an active eye, as recited in claim 1, further comprising Internet access means whereby unknown phone numbers may be searched.

17. A compact hand-held computer device for viewing by a user with an active eye, as recited in claim 1, further comprising a prompt key for indicating that a particular said voiced utterance is a command.

18. A compact hand-held computer device for viewing by a user with an active eye, as recited in claim 1, wherein said housing has a first surface oriented towards the user, said first surface having a recess, said recess having a first end directed towards the user and a second end opposing said first end and directed away from the user, wherein said mirror is mounted within said recess at said first end, and said primary display is mounted in said recess at said second end.

19. A compact hand-held computer device for viewing by a user with an active eye, as recited in claim 1, said housing having a base portion and a sliding portion slidably connected to said base portion, said base portion having an end with said mirror mounted thereto, said sliding portion having an end with said primary display mounted thereto, said primary display in an oppositional relationship with said mirror, whereby the hand-held computer device may be compacted for storage by sliding said slidable portion towards said base portion, and may be opened for use by sliding said slidable portion away from said base portion.

* * * * *